(12) United States Patent
Kawai et al.

(10) Patent No.: US 10,335,890 B2
(45) Date of Patent: Jul. 2, 2019

(54) SEAM WELDING METHOD AND VEHICLE BODY

(71) Applicant: HONDA MOTOR CO., LTD., Tokyo (JP)

(72) Inventors: Yasuhiro Kawai, Tochigi (JP); Noriko Kurimoto, Tochigi (JP); Mitsugu Kaneko, Tochigi (JP); Haruhiko Kobayashi, Tochigi (JP); Kazuhiko Yamaashi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/900,874

(22) PCT Filed: Jun. 25, 2014

(86) PCT No.: PCT/JP2014/066903
§ 371 (c)(1),
(2) Date: Dec. 22, 2015

(87) PCT Pub. No.: WO2014/208629
PCT Pub. Date: Dec. 31, 2014

(65) Prior Publication Data
US 2016/0136751 A1   May 19, 2016

(30) Foreign Application Priority Data

Jun. 25, 2013 (JP) .................................. 2013-132656
Jun. 25, 2013 (JP) .................................. 2013-132657

(51) Int. Cl.
*B23K 11/06* (2006.01)
*B23K 11/11* (2006.01)
(Continued)

(52) U.S. Cl.
CPC ............. *B23K 11/065* (2013.01); *B23K 11/11* (2013.01); *B23K 2201/006* (2013.01); *B62D 25/02* (2013.01)

(58) Field of Classification Search
None
See application file for complete search history.

(56) References Cited

U.S. PATENT DOCUMENTS 4,132,286 A * 1/1979 Hasui ........................ F01N 1/02
                                                              181/265
4,461,134 A * 7/1984 Lowe ........................ E04C 3/07
                                                              206/519

(Continued)

FOREIGN PATENT DOCUMENTS

CN     101808881 A     8/2010
CN     201777121 U     3/2011
(Continued)

OTHER PUBLICATIONS

International Search Report, dated Sep. 16, 2014 (Sep. 16, 2014).
Chinese Office Action dated Jul. 9, 2018, 5 pages.

*Primary Examiner* — Ibrahime A Abraham
*Assistant Examiner* — Gyounghyun Bae
(74) *Attorney, Agent, or Firm* — Rankin, Hill & Clark LLP

(57) ABSTRACT

In a seam welding method, a pressing force applied to workpiece by roller electrodes is reduced and an energization to the roller electrodes is stopped when the roller electrodes pass at least a portion where metal sheets are temporarily fastened together through spot welding, and the pressing force to the workpiece by the roller electrodes and the energization to the roller electrodes are restored after the roller electrodes have passed the spot welded portion.

4 Claims, 2 Drawing Sheets

(51) Int. Cl.
*B62D 25/02* (2006.01)
*B23K 101/00* (2006.01)

(56) References Cited

U.S. PATENT DOCUMENTS

| | | | | |
|---|---|---|---|---|
| 4,804,819 A * | 2/1989 | Farrow | ............... | B23K 11/06 |
| | | | | 219/601 |
| 4,928,372 A * | 5/1990 | Harwood | ............... | B23K 9/007 |
| | | | | 29/890.08 |
| 6,067,759 A * | 5/2000 | House | ............... | E04D 13/0315 |
| | | | | 52/198 |
| 7,312,417 B2 * | 12/2007 | Becker | ............... | B23K 26/10 |
| | | | | 219/121.64 |
| 2003/0107235 A1 * | 6/2003 | Komatsu | ............... | B60J 5/0405 |
| | | | | 296/146.5 |
| 2004/0197135 A1 * | 10/2004 | Wang | ............... | B23K 11/06 |
| | | | | 403/270 |
| 2004/0232731 A1 * | 11/2004 | Corcoran | ............... | B21D 26/033 |
| | | | | 296/205 |
| 2004/0239091 A1 * | 12/2004 | Horton | ............... | B62D 21/02 |
| | | | | 280/781 |
| 2004/0251711 A1 * | 12/2004 | Walther | ............... | B23K 26/26 |
| | | | | 296/146.5 |
| 2005/0230361 A1 * | 10/2005 | Wang | ............... | B23K 11/06 |
| | | | | 219/117.1 |
| 2007/0145773 A1 * | 6/2007 | Saitoh | ............... | B60J 5/101 |
| | | | | 296/146.8 |
| 2008/0265623 A1 * | 10/2008 | Kiyotake | ............... | B62D 21/152 |
| | | | | 296/187.09 |
| 2009/0065484 A1 * | 3/2009 | Wang | ............... | B23K 11/115 |
| | | | | 219/118 |
| 2009/0173722 A1 * | 7/2009 | Cornelius | ............... | B23K 2201/006 |
| | | | | 219/121.64 |
| 2009/0243270 A1 * | 10/2009 | Defoy | ............... | B62D 31/02 |
| | | | | 280/781 |
| 2010/0084892 A1 * | 4/2010 | Yoshida | ............... | B21D 7/08 |
| | | | | 296/203.02 |
| 2010/0231007 A1 * | 9/2010 | Freeman | ............... | B60J 7/022 |
| | | | | 296/210 |
| 2010/0237659 A1 * | 9/2010 | Ishigame | ............... | B62D 21/157 |
| | | | | 296/204 |
| 2010/0252351 A1 * | 10/2010 | Okamoto | ............... | B60R 21/36 |
| | | | | 180/274 |
| 2011/0163074 A1 * | 7/2011 | Kaga | ............... | B23K 11/04 |
| | | | | 219/83 |
| 2013/0088037 A1 * | 4/2013 | Schurter | ............... | B60J 5/0415 |
| | | | | 296/146.5 |
| 2013/0168365 A1 | 7/2013 | Kaga et al. | | |
| 2013/0227890 A1 * | 9/2013 | Kobayashi | ............... | B60J 5/048 |
| | | | | 49/381 |
| 2014/0147693 A1 * | 5/2014 | Yasuyama | ............... | B32B 3/00 |
| | | | | 29/428 |
| 2014/0152053 A1 * | 6/2014 | Watanabe | ............... | B62D 25/02 |
| | | | | 296/193.06 |
| 2015/0021954 A1 * | 1/2015 | Hayakawa | ............... | B62D 25/025 |
| | | | | 296/187.12 |

FOREIGN PATENT DOCUMENTS

| | | | |
|---|---|---|---|
| CN | 103108719 | | 5/2013 |
| JP | 08090266 A | * | 4/1996 |
| JP | 2000-141177 | | 5/2000 |
| JP | 2000-301346 | | 10/2000 |
| JP | 3576404 | | 7/2004 |
| JP | 4609841 | | 10/2010 |
| JP | 2010-253493 | | 11/2010 |
| WO | 2008/099991 | | 8/2008 |

* cited by examiner

SEAM WELDING METHOD AND VEHICLE BODY

TECHNICAL FIELD

The present invention relates to a seam welding method and a vehicle body which is seam welded.

BACKGROUND ART

Conventionally, vehicle bodies such as a motor vehicle have been known in which plural laminated metal sheets are joined together through spot welding at plural locations (refer to Patent Literature 1, for example). However, in forming the vehicle body through spot welding, a larger number of welding spots are required as the size of a member to be welded increases, making it difficult to improve the work efficiency.

On the other hand, as one of resistance welding methods, the seam welding is known, and this seam welding is used for fabrication of a truck's fuel tank, for example (refer to Patent Literature 2, for example). The seam welding is executed by holding plural laminated metal sheets by roller electrodes made up of a pair of circular disc members on side surfaces of the circular disc members, causing the roller electrodes to roll on the metal sheets while causing the roller electrodes to press against the metal sheets with a predetermined pressing force and energizing the roller electrodes. The roller electrodes are, for example used by being attached to an arm of a welding robot. In the seam welding, the roller electrodes are controlled so as to roll on a planned welding portion which is preset. Consequently, according to Patent Literature 2, nuggets are formed continuously between both the roller electrodes by using the seam welding, whereby it is said that airtightness and watertightness are imparted to the fuel tank.

Additionally, in the seam welding, in forming a continuous closed state, that is, an endless welded joint portion, a wide welding area can be ensured, and hence, the seam welding is said to be useful in improving the work efficiency.

PRIOR ART LITERATURE

Patent Literature

Patent Literature 1: JP-R-3576404
Patent Literature 2: JP-B-4609841

SUMMARY OF THE INVENTION

Problem that the Invention is to Solve

Incidentally, the possibility of using the seam welding for fabrication of a side panel of a vehicle body such as a motor vehicle is studied. The side panel is formed by laminating plural metal sheets, and spot welding is performed on plural locations along a circumferential end edge of a door opening portion so as to maintain the shape thereof. Then, for example, in joining the circumferential end edge of the door opening portion in the side panel through seam welding, when setting a planned welding portion along the circumferential end edge, the portions joined through spot welding are included in the planned welding portion. In the event that the seam welding is performed on the portions joined through spot welding from thereabove, the welded state is changed. Therefore, the seam welding has to be performed while avoiding the portions joined through spot welding.

In the seam welding, however, to avoid the spot welding joined portions, the welding is stopped once, and both the roller electrodes are opened to be dislocated sideways from the planned welding portion. Thereafter, the roller electrodes are returned on to the planned welding portion in the next welding starting position and are then closed together, whereafter the welding is restarted. This results in a problem that the processing time becomes long.

On the other hand, in the vehicle body, the numbers of laminated metal sheets differ at many locations, and it is difficult to set conditions for the seam welding at boundary portions where the numbers of laminated metal sheets differ. Therefore, an endless welded joint portion cannot be formed, and hence, it is difficult to apply the seam welding to the fabrication of the side panel of the vehicle body. In addition, in the event of the endless welded joint portion being unable to be formed by the seam welding, when stress is exerted on an end portion of the welded joint portion in a sheet separating direction, there is caused a problem that the laminated metal sheets tend to be separated at the end portion.

Then, a first object of the invention is to provide a seam welding method which can reduce a processing time in seam welding a workpiece in which plural laminated metal sheets are spot welded.

In addition, a second object of the invention is to provide a vehicle body which can prevent the separation of laminated metal sheets at an end portion of a welded joint portion formed through seam welding even though the welded joint portion is not endless and which enables seam welding to be used to join plural laminated metal sheets together through welding.

Means for Solving the Problem

With a view to achieving the first object, a first aspect of the invention provides a seam welding method for joining a workpiece which are plural laminated metal sheets temporarily fastened together through spot welding, including:

holding a welding portion of the workpiece between a pair of roller electrodes;

pressing the roller electrodes against the workpiece with a predetermined pressing force; and rolling the roller electrodes on the workpiece along a planned welding portion which is preset, and energizing the roller electrodes to seam weld the welding portion, wherein:

the pressing force applied to the workpiece by the roller electrodes is reduced below the predetermined pressing force and an energization to the roller electrodes is stopped when the roller electrodes which are rolling on the workpiece along the planned welding portion pass at least a portion where the metal sheets are temporarily fastened together through spot welding; and the pressing force applied to the workpiece by the roller electrodes and the energization to the roller electrodes are restored after the roller electrodes which are rolling on the workpiece along the planned welding portion have passed the portion where the metal sheets are temporarily fastened together through spot welding.

In the seam welding method according to the first aspect of the invention, it is preferable that the pressing force applied to the workpiece by the roller electrodes is reduced to a smallest pressing force that can hold the workpiece when the roller electrodes which are rolling on the workpiece along the planned welding portion pass at least the portion where the metal sheets are temporarily fastened together through spot welding. In addition, the energization to the roller electrodes is stopped at the same time as the pressing force is reduced. The roller electrodes roll on the workpiece along the planned welding portion. By stopping energizing the roller electrodes at the same time as the pressing force is reduced, no seam welding is performed when the roller electrodes pass the portion where the metal sheets are temporarily fastened together through spot welding. Consequently, the occurrence of a change in welded state can be avoided at the portion where the metal sheets are temporarily fastened together through spot welding.

In the seam welding method according to the first aspect of the invention, after the roller electrodes have passed the portion where the metal sheets are temporarily fastened together through spot welding while rolling on the workpiece along the planned welding portion, the pressing force applied to the workpiece by the roller electrodes and the energization to the roller electrodes are restored to thereby resume the seam welding.

According to the seam welding method of the first aspect of the invention, the roller electrodes roll on the workpiece along the planned welding portion at all times, and there is no need to dislocate the roller electrodes sideways from the planned welding portion to avoid the welding of the portion where the metal sheets are temporarily fastened together through spot welding. Consequently, the processing time of the workpiece can be shortened.

With a view to achieving the second object, a second aspect of the invention provides a vehicle body which is formed by joining plural laminated metal sheets together through welding, including:

a first welded joint portion which is formed through seam welding at least at a portion of a welded joint area, which extends linearly along the welded joint area and which has an end portion on either side thereof, and a spot welded area where a second welded joint portion is formed through spot welding in at least a position which faces the end portion of the first welded joint portion.

The vehicle body according to the second aspect of the invention includes the first welded joint portion which is formed through seam welding at least at the portion of the welded joint area, and the first welded joint portion extends linearly along the welded joint area. Here, the first welded joint portion is linear and includes the end portions at the ends thereof, and the vehicle body according to the second aspect of the invention includes the spot welded areas where the second welded joint portions are formed through spot welding in the positions which face the end portions.

Consequently, in the vehicle body according to the second aspect of the invention, even when stress is exerted on the end portion of the first welded joint portion which is formed through seam welding in a separating direction, the second welded joint portion which is formed through spot welding resists the stress so exerted to thereby prevent the separation of the metal sheets at the end portion of the first welded joint portion. As a result, seam welding can be applied to welding joint, thereby making it possible to improve the work efficiency.

In the vehicle body according to the second aspect of the invention, the spot welded area preferably includes a boundary portion where the number of laminated metal sheets differ. It is difficult to set conditions for the seam welding at the boundary portion because the number of laminated metal sheets differ at the boundary portion. However, in the event of the boundary portion being included in the spot welded area, the first welded joint portion can be formed through seam welding while avoiding the boundary portion. Consequently, as a result of the boundary portion being included in the spot welded area, the seam welding can easily be applied to the welding joint to form the welded joint portion.

Incidentally, the vehicle body may include a corner portion where a sharp curve is formed in the welded joint area. In weld joining the corner portion through seam welding, the rolling speed of the roller electrodes needs to be slowed, and hence, it is unavoidable to reduce the work efficiency. Then, in the vehicle body according to the second aspect of the invention, when a corner portion where a sharp curve is formed is included in the welded joint area, the spot welded area preferably includes the corner portion.

As a result of the corner portion being included in the spot welded area, the first welded joint portion can be formed through seam welding by avoiding the corner portion. Consequently, as a result of the corner portion being included in the spot welded area, the seam welding can easily be applied to the welding joint to form the welded joint portion.

MODE FOR CARRYING OUT THE INVENTION

Next, referring to the accompanying drawings, embodiments of the invention will be described in detail.
<First Embodiment>

Figure 1:
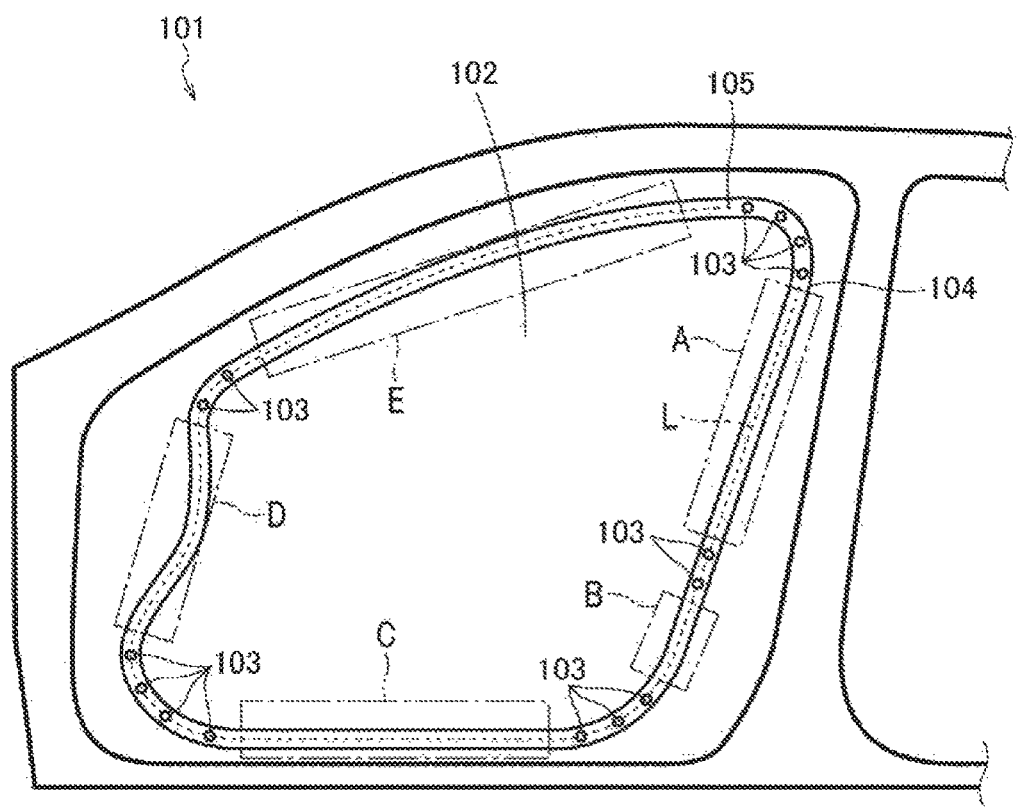
FIG. 1 is a plan view showing a configuration example of a vehicle body to explain a seam welding method of a first embodiment of the invention.

Firstly, referring to FIG. 1, a seam welding method of a first embodiment of the invention will be described in detail, The seam welding method of this embodiment is used in weld joining a circumferential edge portion of a door opening portion 102 in a side panel 101 of a motor vehicle shown in FIG. 1, for example, using the side panel 101 as a workpiece. The side panel 101 is formed by laminating plural metal sheets. To maintain the shape thereof, spot welding is performed at plural location of the circumferential edge portion of the door opening portion 102 to form joint portions 103. The plurality of metal sheets are temporarily fastened together by the joint portions 103.

In the seam welding method of this embodiment, areas A, B, C, D, E lying between the joint portions 103 are defined as welding portions. Then, the welding portions are held between a pair of roller electrodes, not shown. The roller electrodes are caused to roll while being caused to press against the side panel 101 with a predetermined pressing force, and the roller electrodes are energized to execute seam welding. The roller electrodes are circular disc members and are attached to an arm of a welding robot, now shown, for example. While holding the welding portions between side surfaces of the circular disc members, the roller electrodes are caused to roll on the side panel 101 from an initiating end 104 to a terminating end 105 along a planned welding line L which is indicated by a broken line in FIG. 1 as a planned welding portion, whereby seam welding is performed on the areas A, B, C, D, E.

At this time, in case seam welding is performed further on the joint portions 103 where the spot welding has been performed from thereabove, there is caused a concern that the welded state is changed. Then, in the seam welding method of this embodiment, when the roller electrodes pass the joint portions 103, the pressing force applied to the side panel 101 by the roller electrodes is reduced below the predetermined pressing force to a smallest pressing force that an hold the side panel 101. In conjunction with this, energizing the roller electrodes is stopped. Then, after the roller electrodes have passed the joint portions 103, the pressing force applied to the side panel 101 by the roller electrodes and the energization of the roller electrodes are restored to thereby resume the seam welding.

The welding robot stores the shape of the planned welding line L and the positions of the joint portions 103 and controls the pressing force applied to the side panel 101 by the roller electrodes and the energization of the roller electrodes according to a predetermined program.

As a result, according to the seam welding method of this embodiment, there is no such situation that the seam welding is performed further on the joint portions 103 from thereabove, and therefore, the occurrence of a change in welded state can be avoided. Additionally, according to the seam welding of this embodiment, the seam welding is resumed after the roller electrodes have passed the joint portions 103, and therefore, the process time of the side panel 101 can be shortened.

In addition, in the side panel 101, there are portions where the laminating conditions differ which include the number of metal sheets which make up the side panel 101, the materials of the metal sheets, and the thickness thereof, and there may be a situation in which a stepped portion is formed on these portions. Then, in the seam welding method of this embodiment, in a case where the stepped portion exists at the welding portion, when the roller electrodes pass the stepped portion, the pair of roller electrodes can be moved away from each other so as to slightly release the side panel 101, and energizing the roller electrodes can be stopped. Then, after the pair of roller electrodes have passed the stepped portion, the holding of the welding portion by the roller electrodes and the energization to the roller electrodes are restored to thereby resume the seam welding.

At this time, the welding robot stores the positions of the stepped portions as well as the shape of the planned welding line L and the positions of the joint portions 103 and controls the movement of the roller electrodes as well as the pressing force applied to the side panel 101 by the roller electrodes and the energization of the roller electrodes.

By controlling the roller electrodes as described above, it is possible to avoid the abutment of the roller electrodes with the stepped portions, thereby making it possible to prevent the roller electrodes from being damaged.

In this embodiment, the seam welding is described as being used in weld joining the side panel 101 of the motor vehicle. However, the workpiece is not limited to the side panel or the motor vehicle, and hence, the seam welding method may be applied to any workpiece.

<Second Embodiment>

Figure 2:
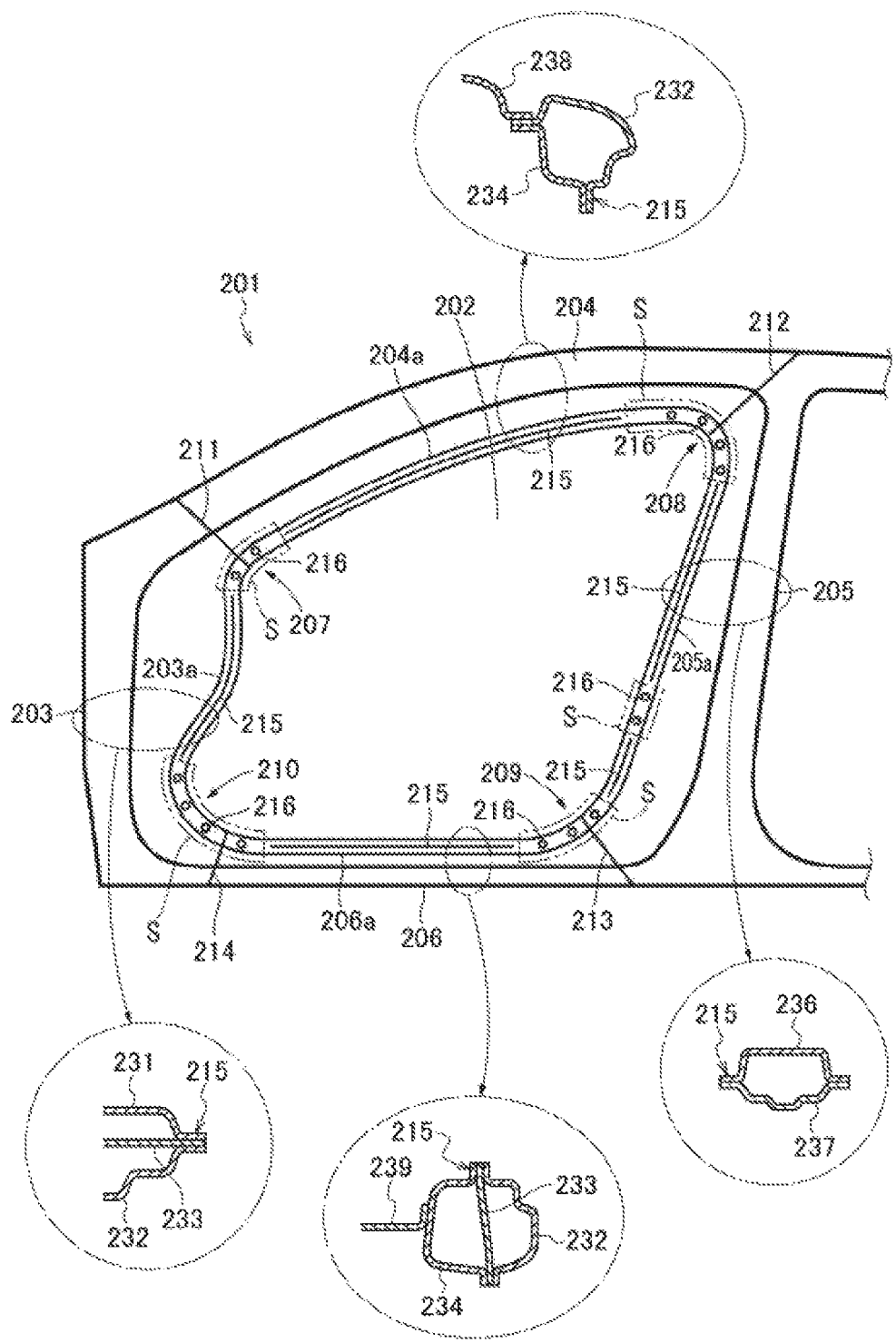
FIG. 2 is a plan view showing a configuration example of a vehicle body of a second embodiment of the invention.

Following the first embodiment, referring to FIG. 2, a vehicle body according to a second embodiment of the invention will be described in detail.

In this embodiment, a side panel 201 of a motor vehicle shown in FIG. 2 will be described as an example of a vehicle body. In the side panel 201 as the vehicle body, a portion which surrounds a front side door opening portion 202 is made up of a front portion 203, a front pillar 204, a center pillar 205 and a side sill 206. The front side door opening portion 202 has a substantially quadrangular shape, and portions corresponding to vertexes of the quadrangle make up corner portions 207, 208, 209, 210 where a sharp curve is formed.

The front portion 203, the front pillar 204, the center pillar 205 and the side sill 206 are each formed by laminating plural pressed metal sheets, and there may be a case where laminating conditions including the number of metal sheets, the materials of the metal sheets and the thickness thereof differ at the front portion 203, the front pillar 204, the center pillar 205 and the side sill 206 depending upon strengths required. For example, as shown in FIG. 2, the periphery of the front portion 203 is made up of a side panel outer 232, a dashboard 231 and a stiffener 233. The periphery of the front pillar 204 is made up of a side panel outer 232, a side panel inner 234, and a roof 238. The periphery of the center pillar 205 is made up of a center pillar inner 236 and a center pillar outer 237. The periphery of the side sill 206 is made up of a side panel outer 232, a side panel outer 232, a side panel inner 234, a stiffener 233 and a floor panel 239. A single mild steel thin sheet may be used as the side panel outer 232 At the front portion 203 where rigidity is required, a mild steel thick sheet or a high tensile thick sheet may be used, and at the other portions, a tailored blank sheet made up of a mild steel thin sheet may be used. At the side sill 206, a high tensile steel thick sheet may be used as the side panel inner 234, and at the front pillar 204, a tailored blank sheet made up of a mild steel thick sheet may be used as the side panel inner 234. Further, a high tensile steel thick sheet may be used as the center pillar inner 236 and the center pillar outer, and a thick sheet (of mild steel or high tensile steel) may be used as the reinforcing stiffener 233. As a result, as boundaries between those sections, boundary portions 211, 212, 213, 214 are formed where the laminating conditions of metal sheets differ. Here, the boundary portions 211, 212, 213, 214 are formed at the corner portions 207, 208, 209, 210, respectively. The boundary portions 211, 212, 213, 214 shown in FIG. 2 are shown schematically as an example and hence can be changed as required.

The front portion 203, the front pillar 204, the center pillar 205 and the side sill 206 include flange portions 203*a*, 204*a*, 205*a*, 206*a*, respectively, which form a circumferential edge portion of the front side door opening portion 202, In the side panel 201, the flange portions 203*a*, 204*a*, 205*a*, 206*a* constitute welded joint areas.

In the side panel 201, in those welded joint areas, a welded joint portion 215 which is formed through seam welding is provided in part of each of the flanges portions 203*a*, 204*a*, 205*a*, 206*a*. The welded joint portion 215 extends linearly along the welded joint area and has end portions at both ends thereof.

In the side panel 201, a spot welded area S is provided in portions which are sandwiched by the welded joint portions 215, 215, and the spot welded areas S each include a welded joint portion 216 which is formed through spot welding in positions facing the end portions of the welded joint portions 215.

The spot welded areas S may include other welded joint portions 216 in positions other than those facing the end portions of the welded joint portions 215 and may include the corner portions 207, 208, 209, 210 and the boundary portions 211, 212, 213, 214. When the spot welded areas S include the boundary portions 211, 212, 213, 214, the welded joint portions 216 may be provided in positions which sandwich the boundary portions 211, 212, 213, 214. These welded joint portions 216 also function to temporarily fasten the plurality of laminated metal sheets together.

When stress is exerted on the end portion of the welded joint portion 215 formed through seam welding in a separating direction, normally, the plurality of laminated metal sheets are easily separated. However, in the side panel 201 of this embodiment, the welded joint portions 216 are formed through spot welding in the positions which face the end portions of the welded joint portions 215, and therefore, even when stress is exerted in the separating direction, the welded joint portions 216 resist the stress to prevent the plurality of laminated metal sheets from being separated at the end portions of the welded joint portions 215.

The side panel 201 of this embodiment can be fabricated as follows, for example.

Firstly, plural metal sheets are laminated to form a front portion 203, a front pillar 204, a center pillar 205 and a side sill 206. Next, spot welding is performed on spot welded areas S by a first welding robot, not shown, to form plural welded joint portions 216.

In the spot welded area S which includes a corner portion 207 and a boundary 211, the welded joint portion 216 is formed at one location on either side of the boundary portion 211, and hence, the welded joint portions 216 are formed at two locations in total. In the spot welded area S which includes a corner portion 208 and a boundary portion 212, the welded joint portion 216 is formed at one location on either side of the boundary portion 212, at one location lying closer to the front pillar 204 and at one location lying closer to the center pillar 205, and hence, the welded joint portions 216 are formed at four locations in total. In the spot welded area S which includes a corner portion 209 and a boundary portion 213, the welded joint portion 216 is formed at one location on either side of the boundary portion 213 and at one location lying closer to the side sill 206, and hence, the welded joint portions 216 are formed at three locations in total. In the spot welded area S which includes a corner portion 210 and a boundary portion 214, the welded joint portion 216 is formed at one location on either side of the boundary portion 214 and at two location lying closer to the front portion 203, and hence, the welded joint portions 216 are formed at four locations in total. Further, in the spot welded area S which is situated at a middle portion of the center pillar 205, the welded joint portion 216 is formed in positions which face the end portions of the adjacent welded joint portions 215, and hence, the welded joint portions 216 are formed at two locations in total.

At this time, the first welding robot stores the positions of the welded joint portions 216 in advance and performs the spot welding according to a predetermined program.

Next, in areas lying between the spot welded areas S, S, the plurality of metal sheets which make up the flange portions 203a, 204a, 205a, 206a are held between a. pair of roller electrodes, not shown, the roller electrodes are caused to roll on the flanges portions 203a, 204a, 205a, 206a while being caused to press against the these flange portions with a predetermined pressing force. At the same time, the roller electrodes are energized to perform seam welding on the flange portions 203a, 204a, 205a, 206a. The roller electrodes are circular disc members and are attached to an arm of a second welding robot, now shown, for example. The roller electrodes hold the flange portions 203a, 204a, 205a, 206a by side surfaces of the circular disc members and are caused to roll along a circumferential edge portion of a front side door opening portion 202 from a position close to the welded joint portion 216 which is formed at a side of the boundary portion 212 of the flange portion 205a to a position close to the welded joint portion 216 which is formed at a side of the boundary portion 212 of the flange portion 204a.

At this time, when the roller electrodes pass over the welded joint portions 216, the pressing force applied to the flange portions 203a, 204a, 205a, 206a by the roller electrodes is reduced below the predetermined pressing force to a smallest pressing force that can hold the flange portions 203a, 204a, 205a, 206a. At the same time as the pressing force is so reduced, energizing the roller electrode is stopped. Then, after the roller electrodes have passed the spot welded joint areas S, the pressing force applied to the flange portions 203a, 204a, 205a, 206a by the roller electrodes and the energization of the roller electrodes are restored to thereby resume the seam welding.

When the roller electrodes pass over the boundary portions 213, 214, 211, the pair of roller electrodes are caused to move away from each other, so that the flange portions 203a, 204a, 205a, 206a are slightly released. Then, after the pair of roller electrodes have passed the boundary portions 213, 214, 211, the holding of the flange portions 203a, 204a, 205a, 206a by the roller electrodes is restored.

At this time, the second welding robot stores the shapes of the flange portions 203a, 204a, 205a, 206a and the positions of the welded joint portions 216 and the boundary portions 213, 214, 211. The second welding robot controls the pressing force applied to the flange portions 203a, 204a, 205a, 206a by the roller electrodes, the energization to the roller electrodes, and the holding of the flange portions 203a, 204a, 205a, 206a by the roller electrodes according to a predetermined program.

As a result, the side panel 201 of this embodiment can perform seam welding only on the areas excluding the spot welded areas S to thereby form the welded joint portions 215, thereby making it possible to perform the welding workpiece with good efficiency.

In this embodiment, the seam welding is described as being used to weld joining the side panel 201. However, the application of the seam welding is not limited to the side panel, and hence, the seam welding may be applied to any part of the vehicle body as long as the part is formed by weld joining plural laminated metal sheets together.

This patent application is based on the Japanese Patent Application (No. 2013-132656) filed on Jun. 25, 2013 and the Japanese Patent Application (No. 2013-132657) filed on Jun. 25, 2013, the contents of which are incorporated herein by reference.

DESCRIPTION OF REFERENCE NUMERALS AND CHARACTERS 101 side panel
103 joint portion
201 side panel
202 front side door opening portion
207 corner portion
208 corner portion
209 corner portion
210 corner portion
211 boundary portion
212 boundary portion
213 boundary portion
214 boundary portion
215 welded joint portion by seam welding
216 welded joint portion by spot welding
L planned welding portion
S spot welded area

The invention claimed is:
1. A vehicle body which is formed by joining plural laminated metal sheets together through welding, the vehicle body comprising:
a side panel in which a front side door opening for an associated front side door is defined,
a portion of the side panel surrounding the front side door opening includes a front portion, a front pillar, a center pillar, and a side sill, the front portion, the front pillar, the center pillar, and the side sill include flange portions which form a circumferential edge portion of the side panel that defines the front side door opening, the circumferential edge portion constitutes a welded portion, and the circumferential edge portion is quadrangular shaped with linear portions and corner portions where a sharp curve is formed, the side panel of the vehicle body including:

spot welded areas formed in the welded portion, the spot welded areas including spot welded joint portions formed through spot welding, the spot welded areas formed at the corner portions and include a boundary portion where number of laminated metal sheets differ; and seam welded joint portions formed in the welded portion, the seam welded joint portions formed through seam welding, the seam welded joint portions being formed along the linear portions between the spot welded areas formed at the corner portions, wherein in the spot welded areas the spot welded joint portions are located on either side of the boundary portion and in positions which face end portions of the seam welded joint portions.

2. The vehicle body according to claim 1, wherein the welded portion where the seam welded joint portions are formed is held between a pair of roller electrodes attached to an arm of a welding robot.

3. The vehicle body according to claim 2, wherein while holding the welded portion between the roller electrodes, the roller electrodes are caused to roll on the side panel from an initiating end to a terminating end along the welding portion, whereby seam welding is performed on the welding portion.

4. The vehicle body according to claim 3, wherein the roller electrodes when passing over the spot welded areas on the welded portion are operative to reduce a pressing force applied to the side panel below a predetermined pressing force to a smallest pressing force for holding the side panel and an energization of the roller electrodes is stopped when the roller electrodes are in the spot welded areas, and having passed the spot welded areas the pressing force applied to the side panel by the roller electrodes and the energization of the roller electrodes are restored to thereby resume the seam welding on the welded portion.

* * * * *